United States Patent [19]

Clegg

[11] Patent Number: 4,657,353
[45] Date of Patent: Apr. 14, 1987

[54] CONICAL BEAM CONCENTRATOR

[76] Inventor: John E. Clegg, 2320 Keystone Dr., Orlando, Fla. 32806

[21] Appl. No.: 755,881

[22] Filed: Jul. 17, 1985

[51] Int. Cl.⁴ .................. G02B 13/18; G02B 17/08
[52] U.S. Cl. ................................. 350/432; 350/443
[58] Field of Search ........................... 350/432, 443

[56] References Cited

U.S. PATENT DOCUMENTS

| | | | |
|---|---|---|---|
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,492,438 | 1/1985 | Clegg | 350/432 |
| 4,492,439 | 1/1985 | Clegg | 350/432 |
| 4,521,085 | 6/1985 | Clegg | 350/432 |

Primary Examiner—John K. Corbin
Assistant Examiner—Rebecca D. Gass

[57] ABSTRACT

A single conical lens with a planar section (face) which transmits an annular incipient beam, a concave conical reflective section which reflects the beam, and a concave conical section which refracts the beam, forming a concentrated circular whole beam which is emitted parallel to the optic axis.

1 Claim, 3 Drawing Figures

CONICAL BEAM CONCENTRATOR

BACKGROUND

The code designation of the lens is RLT:C (R—refracting section of a component lens, L—reflecting section of a component lens, T—transmitting section of a component lens, and C—concentrating stage lens).

Prior art includes the Conical Refractor, U.S. Pat. No. 2,882,784, Apr. 21, 1959, by D. S. Toffolo. This is a single lens (RR:C) with a convex conical section which refracts an annular incipient beam and with a concave conical section which refracts and emits a concentrated circular whole beam. It produces a concentrated beam of the same intensity as the subject lens but by different concentrating means.

Prior art includes also the Reflective Beam Concentrator, U.S. Pat. No. 4,325,612, Apr. 20, 1982, by this inventor. This concentrator has an upper component mirror which can be separated from the lower component lens and raised and enlarged so as to receive a wider incipient beam.

DRAWINGS

DESCRIPTION

Figure 1:
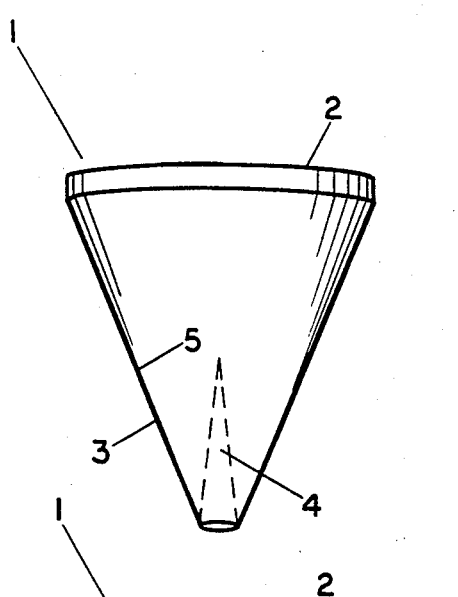
FIG. 1 is a perspective view of the single lens comprising the conical beam concentrator.

FIG. 1 is a perspective view of the single lens 1 of the conical beam concentrator showing the edge of planar section 2, concave conical reflective section 3 and concave conical section 4. Concave conical reflective section 3 is a rear-surface mirror affixed to convex conical wall 5 of the lens. The section functions as an inner reflecting surface, and this determines which descriptive adjective (concave or convex) is used.

Figure 2:
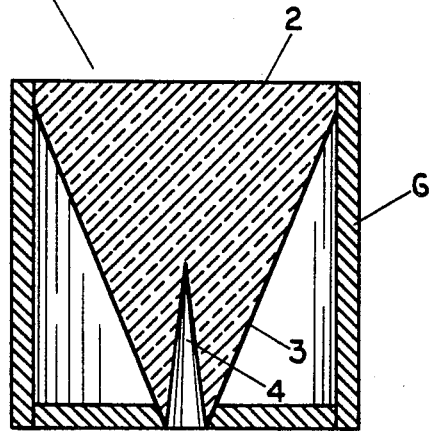
FIG. 2 is an elevation of the lens shown in section and mounted inside a casing.

FIG. 2 is an elevation of the concentrator with the lens 1 shown in section and mounted inside casing 6.

Figure 3:
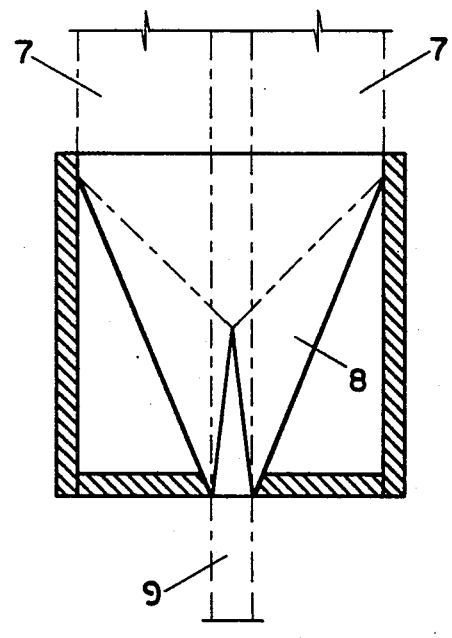
FIG. 3 is an elevation of the lens with a ray diagram.

FIG. 3 is an elevation of the concentrator with a ray diagram. Annular incipient beam 7 of direct sunlight is received and transmitted by planar section 2 and reflected by concave conical reflective section 3, forming convergent conical reflected beam 8. Beam 8 is refracted by concave conical section 4, forming concentrated circular whole beam 9 which is emitted parallel to the optic axis of the lens.

The lens receives an annular incipient beam and therefore is only 98% effective as a beam concentrator.

The lens cannot be used as a magnifier because the inner and outer portions of the image are reversed.

I claim:

1. A conical beam concentrator comprising a single lens (1) having a planar section (2) with receives and transmits an annular incipient beam (7) of direct solar radiation, having a concave conical reflective section (3) which reflects beam (7) in toward the optic axis of the lens, forming a convergent conical beam (8), and having a concave conical section (4) which refracts beam (8), forming concentrated circular whole beam (9) which is emitted parallel to the optic axis.

* * * * *